United States Patent
Witkowski (10) Patent No.: US 6,449,605 B1
(45) Date of Patent: *Sep. 10, 2002

(54) USING A MATERIALIZED VIEW TO PROCESS A RELATED QUERY CONTAINING A ONE TO MANY LOSSLESS JOIN

(75) Inventor: Andrew Witkowski, Foster City, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,649

(22) Filed: Dec. 28, 1998

(51) Int. Cl.⁷ .............................................. G06F 17/00

(52) U.S. Cl. .............................. 707/3; 707/4; 707/201; 707/203

(58) Field of Search ...................... 707/1–206; 711/1–6, 711/200–203; 709/1, 100; 717/1–11, 136

(56) References Cited

U.S. PATENT DOCUMENTS

| | | | |
|---|---|---|---|
| 5,822,751 A | * 10/1998 | Gray et al. ..................... | 707/3 |
| 5,897,632 A | 4/1999 | Dar et al. ....................... | 707/2 |
| 6,003,022 A | * 12/1999 | Eberhard et al. ........... | 707/200 |
| 6,032,144 A | * 2/2000 | Srivastava et al. .............. | 707/3 |
| 6,125,360 A | 9/2000 | Witkowski et al. ............. | 707/2 |
| 6,134,543 A | 10/2000 | Witkowski et al. ............. | 707/2 |
| 6,199,063 B1 | 3/2001 | Colby et al. .................... | 707/4 |

OTHER PUBLICATIONS

Bello et al., "Materialized Views in Oracle", VLDB '98, Proceedings of the 24th International Conference on Very Large Data Bases, Aug. 24–27, 1998, New York City, New York, USA, pp. 659–664.* http://www.research.att.com/conf/vldb98/program.html, Mar., 2001.*
http://www.research.att.com/conf/vldb98, Mar., 2001.*
Jajoda et al., "Polyinstantiation integrity in multilevel relations"; May 7–9, 1990; Research in Security and Privacy, 1990, Proceedings, 1990 IEEE Computer Society Symposium on, pp. 104–115.*
Schewe, "On the unification of query algebras and their extension to Rational Tree Structures"; Jan. 29–Feb. 2, 2001; Database Conference, 2001, ADC 2001, Proceedings, 12th Australasian, pp. 52–59.*
Strocker et al., "Integrating semi–join–reducers into state–of–the–art query processors"; Apr. 2–6, 2001; Data Engineering 2001, Proceedings 17th International Conference on, pp. 575–584.*
Bhargava, Gautam et al., "Hypergraph based reorderings of outer join queries with complex predicates", Proceedings of the 1995 ACM SIGMOND International Conference on Management of Data and Symposium on Principles of Database Systems, May 22–25, 1995, AC.
Bhagrava, Gautam et al., "Efficient processing of outer joins and aggregate junctions", Proceedings of the Twelfth International Conference Data Engineering, 1996., Feb. 26–Mar. 1, 1996, pp 441–449.
Biggs, Maggie, "Oracle8 still in pole position", InfoWorld, Framingham; Dec. 15, 1997, vol. 19, Issue 50, p. 1, 97, ISSN:01996649.

(List continued on next page.)

*Primary Examiner*—David Jung
(74) *Attorney, Agent, or Firm*—Hickman Palermo Truong & Becker LLP; Marcel K. Bingham (57) ABSTRACT

A method and apparatus for transforming queries is provided. A select-project-join query Q is rewritten into another query that joins a materialized view M and a subset of the tables from Q not in the common section portion of Q. The common section may be one-to-many lossless with respect to the join with the materialized view delta. As compared to one-to-one rewrites, the one-to-many rewrites described herein provide a more general class of rewrites.

20 Claims, 8 Drawing Sheets-

OTHER PUBLICATIONS

Chen, Arbee, "Outerjoin Optimization in Multidatabase Systems", Proceedings of the Second International Symposium on Databases in Parallel and Distributed Systems, 1990, Jul. 2–4 1990, pp 211–218.

Pang, HweeHwa et al., "Partially Preemptble Hash Joins", Proceedings of the 1993 ACM SIGMOND international conference on Mangement of data, 1993, pp 59–68.

Ross, Kenneth et al., "Materialized view maintenance and integrity constraint checking: trading space for time", Proceedings of the 1996 ACM SIGMOND international conference on Management of data, Jun. 3–6, 1996, pp 447–458.

O'Neil et al., "Multi–Table Joins Through Bitmapped Join Indices", SIGMOND Record, vol. 24, No. 3, Sep. 1995, pp 8–11.

Yan, Weipeng et al., "Performing Group–By before Join", Proceedings of the $10^{th}$ International Conference on Data Engineering, 1994, Feb. 14–18, 1994, pp. 89–100.

Lee, Byung Suk et al., "Outer joins and filters for instantiating Objects from relational databases through views", IEEE Transactions on Knowledge and Data Engineering, Feb. 1994, vol. 6, Issue 1, pp 108–119.

Log, Ming–Ling et al., "Spatial Hash–Joins", Proceedings of the 1996 ACM SIGMOND International Conference on Management of Data, 1996, pp 247–258.

Marek, Robert et al., "TID Hash Joins", Proceedings of the third international conference in Information and knowledge management, 1994, No. 2–, Dec. 2, 1994, pp 42–49.

Mishra, Priti et al., "Join Processing in Relational Databases", ACM Computing Surveys, vol. 24, No. 1, Mar. 1992, pp 63–113.

Chaudhuri, Surajit et al., "Optimizing Queries with Materialized Views", Proceedings of the Eleventh International Conference on Data Engineering, Mar. 6–10, 1995, pp. 190–200.

Gopalkrishnan, Vivekanand et al., "Issues of Object–Relational View in Data Warehousing Environment", 1998 IEEE International Conference on Systems, Man, and Cybernetics, Oct. 11–14, 1998, vol. 3, pp. 2732–2737.

Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.

Segev, Arie et al., "Maintaining Materialized Views in Distributed Databases", Proceedings of the Fifth International Conference on Data Engineering, Feb. 6–10, 1989, pp. 262–270.

* cited by examiner

| l.row | l.a | l.b |
|---|---|---|
| $L_1$ | 1 | a |
| $L_2$ | 2 | b |
| $L_3$ | 2 | c |
| $L_4$ | 3 | d |

321

O ~330

| o.row | o.a | o.b |
|---|---|---|
| $O_1$ | 1 | a |
| $O_2$ | 2 | e |
| $O_3$ | 5 | c |
| $O_4$ | 1 | g |

S ~340

| s.a | s.b |
|---|---|
| s | a |
| t | e |
| u | a |

C ~350

| c.a | c.b | c.c |
|---|---|---|
| 1 | f | 5 |
| 2 | g | 5 |

L><O><C Table ~380

| l.a | l.b | o.a | o.b | c.a | c.b |
|---|---|---|---|---|---|
| 1 | a | 1 | a | 1 | f |
| 2 | b | 2 | e | 2 | g |
| 2 | c | 2 | e | 2 | g |
| 1 | a | 1 | g | 1 | f |

MJV = SELECT l.row, l.a, l.b, o.row, o.a, o.b, s.a, s.b
 FROM S, L, O
 WHERE o.b = s.b (+) and
  l.a = o.a

FIG. 4A — 410

SELECT l.a, l.b, o.a, o.b, c.a, c.b
 FROM C, L, O  — FROM list items 424
 WHERE o.a = c.a and
logical — l.a = o.a and
expression  c.c = 5
426

FIG. 4B — 420

SELECT l.a, l.b, o.a, o.b, c.a, c.b,
FROM C
 (SELECT DISTINCT l.rowid, l.a, l.b, o.rowid, o.a, o.b — query block 438
  FROM MJV) — 370
WHERE o.a = c.a and
 c.c = 5

FIG. 4C — 430

SELECT l.a, l.b, o.a, o.b, c.a, c.b,
FROM
 (SELECT DISTINCT l.rowid, l.a, l.b, o.rowid, o.a, o.b, c.rowid
  FROM C, MJV — 370
  WHERE o.a = c.a and
   c.c = 5  )

USING A MATERIALIZED VIEW TO PROCESS A RELATED QUERY CONTAINING A ONE TO MANY LOSSLESS JOIN

FIELD OF THE INVENTION

The present invention relates to optimizing queries, and in particular, to rewriting join queries to access data through a view or from a materialized view.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it is not desirable for certain users to have access to all of the columns of a table. For example, one column of an employee table may hold the salaries for the employees. Under these circumstances, it may be desirable to limit access to the salary column to management, and allow all employees to have access to the other columns. To address this situation, the employees may be restricted from directly accessing the table. Instead, they may be allowed to indirectly access the appropriate columns in the table through a "view".

A view is a logical table. As logical tables, views may be queried by users as if they were a table. However, views actually present data that is extracted or derived from existing tables. Thus, the problem described above may be solved by (1) creating a view that extracts data from all columns of the employee table except the salary column, and (2) allowing all employees to access the view.

The data presented by conventional views is gathered and derived on-the-fly from the base tables in response to queries that access the views. The data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive.

A materialized view, on the other hand, is a view for which a copy of the view data is stored separate form the base tables from which the data was originally gathered and derived. The data contained in a materialized view is referred to herein as "materialized data". Materialized views eliminate the overhead associated with gathering and deriving the view data every time a query accesses the view.

However, to provide the proper data, materialized views must be maintained to reflect the current state of the base tables. When the base tables of a materialized view are modified, computer resources must be expended to both determine whether the modifications require corresponding changes to the materialized data, and to make the required corresponding changes. Despite the high cost associated with maintaining materialized views, using a materialized view can lead to significant overall cost savings relative to a conventional view when the materialized view represents a set of data that is infrequently changed but frequently accessed.

A view is defined by metadata referred to as a view definition. The view definition contains mappings to one or more columns in the one or more tables containing the data. Columns and tables that are mapped to a view are referred to herein as base columns and base tables of the view, respectively.

Typically, the view definition is in the form of a database query. These queries, like any database query, must conform to the rules of a particular query language such as the ANSI Structured Query Language (SQL). For example, the query:

SELECT T.a FROM T WHERE T.b=1 retrieves column T.a of table T for those rows whose value in T.b equals 1. The above query includes a SELECT clause (i.e. "SELECT T.a"), a FROM clause (i.e. "FROM T"), and a WHERE clause (i.e. "T.b=1"). The FROM clause specifies one or more tables or views from which to retrieve values. The tables or views are referred to as the FROM list. The SELECT clause specifies one or more columns in the items in the FROM list from which to retrieve values. The one or more columns are referred to as the SELECT list. The WHERE clause specifies the rows from which the values are retrieved. Specifically, the WHERE clause contains one or more logical expressions defining criteria that must be meet by the rows from which values are retrieved.

Views are often based on joins of two or more tables. A join is an operation that combines rows from two or more tables and views that meet a join condition.

Figure 1:
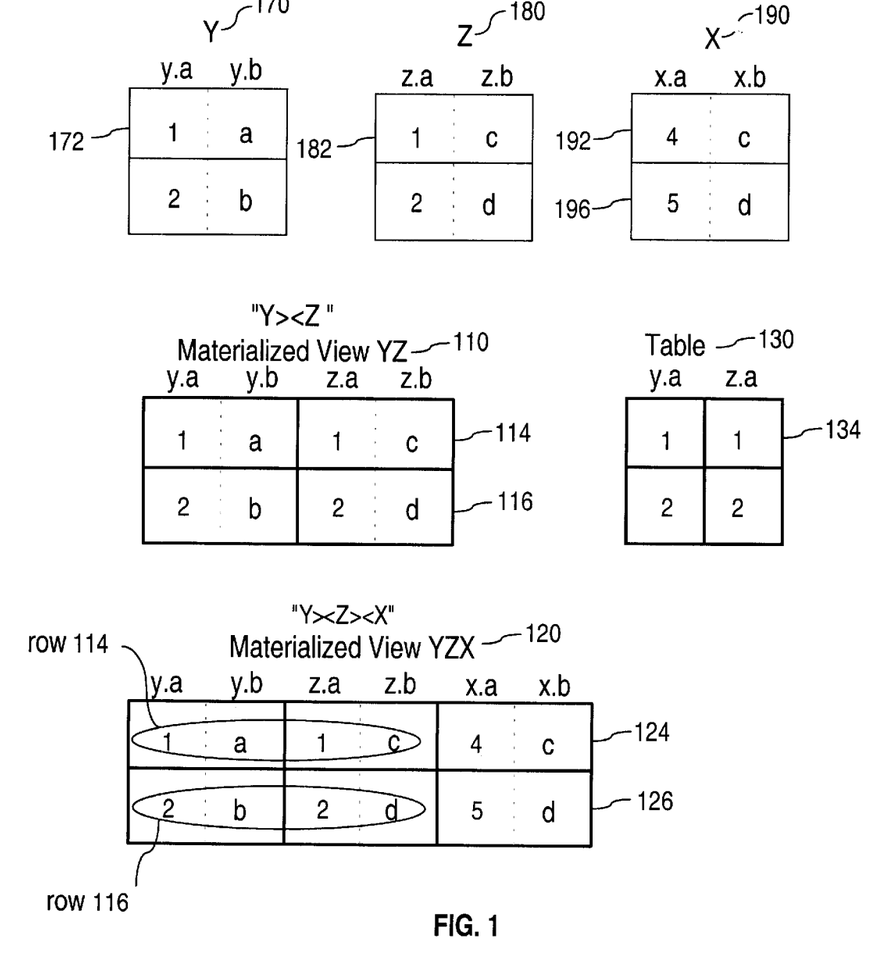
FIG. 1 is block diagram depicting tables and materialized views.

FIG. 1 shows tables that are used to illustrate a join. FIG. 1 shows tables X 190, Y 170, and Z 180. For example, materialized view YZ 110 represents the results of an "equijoin" between tables Y 170 and Z 180. An equijoin is a particular type of join where a row from a first table is combined with one or more rows from a second table, if the value in a specified column from the first table equals a value in a specified column from the second table. For example, combining the rows from table Y 170 and table Z 180 using the join condition y.a=z.a produces materialized view YZ 110. In materialized view YZ 110, row 114 was formed by combining row 172 (i.e. columns y.a and y.b in row 114) and 182 (i.e. columns z.a and z.b in row 114) because for rows 172 and 182, the value in y.a equals 1. the value in z.a. A join is performed whenever a join is specified by a query.

As a matter of convenience, the value in a column of a row may be referred to by the label or name of the column. For example, the expression "value in y.a equals the value in z.a" may be expressed as "y.a equals z.a", or "y.a=z.a".

A join may be specified by a query by including the tables to be joined in the FROM list and including a logical expression specifying the needed join conditions in the WHERE clause. For example, the previous equijoin of tables Y 170 and Z 180 may be specified by a query as follows:

SELECT*FROM Y, Z WHERE y.a=z.a

In addition to join conditions, the WHERE clause of a join query can also contain other conditions that refer to columns of only one table. These conditions can further restrict the rows returned by the join query.

Generating joins in response to receiving join queries can require a substantial amount of processing. To reduce the amount of such processing, a database manager transforms join queries to retrieve data from the "preprocessed" materialized data residing in a materialized view. Currently, most database systems that include query rewrite mechanisms rewrite a query to access a particular materialized view under two conditions.

The first condition is that joins in a materialized view match exactly with joins in a query, with possibly zero or more additional joins in the query. For example, a materialized view joins tables A and B. A query specifies a join of A,B and J. The query join condition for the join of A and B is identical to the materialized view join condition for the join of A and B. Thus, the first condition is satisfied.

The second condition is satisfied if all necessary columns of a query can be obtained using the data stored in the materialized view. If values from a column necessary for the processing of a query are not contained in the materialized view, then the second condition is not satisfied.

If both conditions are satisfied, then the rewrite mechanism determines that the received query can be rewritten to reference the materialized view in question. Unfortunately, as these tests are currently applied, database servers often conclude that materialized views cannot be used to process a query when in fact they could be. In fact, database servers may conclude that a query cannot be rewritten to access a materialized view when use of the materialized view would actually be the most efficient way to process the query.

Based on the foregoing, it is clearly desirable to provide a query rewrite mechanism that is capable of rewriting queries to access materialized views that would otherwise have been considered ineligible by conventional rewrite mechanisms.

SUMMARY OF THE INVENTION

A method and apparatus for transforming queries is described. According to an aspect of the present invention, a select-project-join query Q is rewritten into another query that joins a materialized view M and a subset of the tables from Q not in the common section portion of Q. The common section may be one-to-many lossless with respect to the join with the materialized view delta. As compared to one-to-one rewrites, the one-to-many rewrites described herein provide a more general class of rewrites.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for transforming queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

TERMS AND NOTATION

For the purpose of explanation, the following terms and conventions are used herein to describe embodiments of the invention:

Let $R ><_{p(r,s)} S$ denote an inner join between tables R and S on condition p(r,s). The result is another table which consists of all rows from R and S that satisfy the condition p(r,s). For example, $R ><_{r.c=s.c} S$ is an inner join of R and S on condition r.c=s.c. If the condition is not relevant to the context of discussion, a shorter notation $R><S$ may be used.

Let $R ->_{p(r,s)} S$ denote an outer join between tables R (the left table) and S (the right table) on condition p(r,s). An outer join contains all rows from R and S that satisfy the condition p(r,s) and all remaining rows from R, the left table, that do not (i.e. do not satisfy the condition p(r,s)). The latter rows are called the anti-join rows. All columns from S (i.e. right table) are set to null for the antijoin rows.

A select-project-join query is a query that contains joins, selections on individual tables, and projections on a subset of columns of individual tables. A "selection" is a subset of rows of a table that satisfy some condition. For example, r.c=1 is a selection on rows of R where column c is 1. A "projection" is a subset of columns of a table. The ANSI SQL query language defines the projection with the SELECT clause, which lists the projected columns of tables and defines the selection and join with the WHERE clause. For example, SELECT r.c, s.c FROM R, S WHERE r.c=s.c AND r.x=1 AND s.y=1, projects the join $R><_{r.c=s.c}S$ on columns r.c and s.c and restricts the tables R and S to rows where r.x=1 and s.y=1 respectively.

A join J1 is derivable from a given join J2, if the join J1 can be derived from J2. For example, an inner join $J1=R><_{r.a=t.a}S$ is derivable from the outer join $J2=R->_{r.a=t.a}S$ as we can filter the anti-join rows from J2 to obtain J1. Observe that a join is derivable from itself. A semi-join $R>_{r.a=t.a}S$ is derivable from inner join $R->_{r.a=t.a}$ as well as from outer join $R->_{r.a=t.a}S$. Anti-join $R->_{r.a=t.a}S$ is derivable from outer join $R->_{r.a=t.a}S$.

A unique key (UK) is a column or set of columns that uniquely identify rows in a table. At least one column of a UK must be not null. One of the UKs of a table may be designated as a primary key (PK).

A join $R><S$ is lossless with respect to R if it preserves all rows of R. By convention we will place the preserved table, R, as the first table in the join and will sometimes skip the phrase with respect to R'. A left outer join $R->S$ naturally preserves all rows of R, and is thus lossless.

A join $R><S$ is a one-to-one join if a row from R joins with at most one row from S. A join $R><S$ is one-to-one lossless with respect to R if the join is lossless with respect to R and one-to-one with respect to R.

A join R><S is one-to-many if a row from R joins with more than one row from S.

Referential Integrity (RI) is a relationship between columns of two tables where the values of the columns of one table, called the child columns, are limited to the set of values in the columns of the other table, called the parent columns. The R.c column is referred to as being referentially constrained by the S.c column. Observe that the join R><r.c=s.cS where the column R.c is referentially constrained by the S.c column is lossless.

A rowid pseudo-column contains a unique identifier for each row in a table. A pseudo-column may, for example, simply represent the values of the actual storage locations at which the rows are stored.

In ANSI SQL tables may contain duplicate rows. A DISTINCT operator is provided to eliminated duplicates of rows that have the same values in a specified set of columns. For example:

SELECT DISTINCT T.a, T.b FROM T returns only distinct two-column rows from T even if T originally contained duplicates.

Query Graphs

Figure 2:
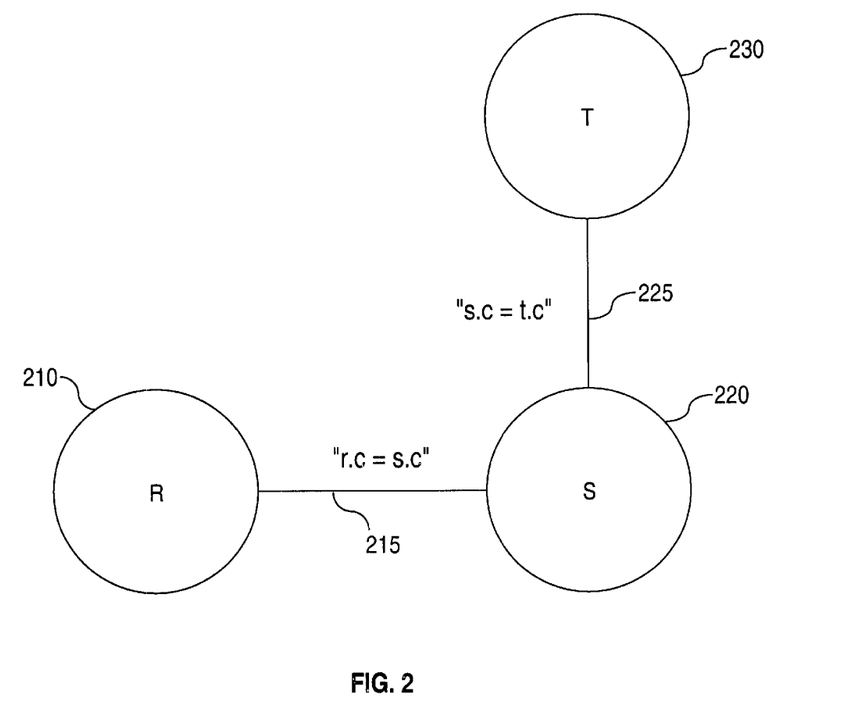
FIG. 2 is a block diagram depicting a query subgraph according to an embodiment of the present invention.

FIG. 2 shows a query graph, which is a graphical representation of joins in a query.

Nodes in the graph represent tables and edges represent joins. For example, graph 210 represents a query specifying the join $R><_{r.c=s.c}S><_{s.c=t.c}T$, or R><S><T for short. The query joins tables R, S and T on the condition (r.c=s.c and s.c=t.c). Node 210 represents table R, node 220 table S, and node 230, table T. Edge 215 represents $R><_{r.c=s.c}S$ and edge 225 represents $S><_{s.c=t.c}T$.

One-To-One-Lossless Rewrites

During a rewrite of query block Q with materialized view M, the join graph G(M) of a materialized view M is compared with the join graph G(Q) of a query block to identify three join subgraphs. The "intersection subgraph" G(I) represents the nodes and edges overlapped by G(M) and G(Q), so G(I)=G(M)∩G(Q). The "delta subgraph" ΔG(Q) represents the part of G(Q) that is not in G(I), so ΔG(Q)=G(Q)-G(I). The "materialized view delta subgraph" ΔG(M) represents the part of G(M) that is not in G(I), so AG(M)'G(M)-G(I). For example, if query Q joins tables O><P><R><S and materialized view M joins R><S><T><U, then the intersection subgraph G(I) is R><S, the delta query subgraph ΔG(Q) is O><P, and the materialized view delta subgraph ΔG(M) is T><U. The set of joins that correspond to the intersection subgraph G(I) are referred to as the "common section" (i.e. R><S), the set of joins that correspond to the delta subgraph ΔG(Q) are referred to as the "query delta" (i.e. O><P), and the set of joins that correspond to the materialized view delta subgraph ΔG(M) are referred to as the "materialized view delta" (T><U).

Query rewrite mechanisms may be based on decomposing a query graph G(Q) into a join between the delta subquery graph ΔG(Q) and the intersection graph G(I), i.e., G(Q)= ΔG(Q)><G(I). The query may be written to replace the common section G(I) portion of the query with a materialized view, i.e., G(Q)=ΔG(Q) ><G(M). Thus the algorithms recover G(Q) by joining ΔG(Q) to the materialized view. This transformation is possible only when certain tests referred to as the "one-to-one lossless" rewrite conditions are satisfied. Select-project-join queries have two tests.

A. The Join Compatibility Test requires that:
 1. The intersection subgraph G(I) must be contain at least one table.
 2. The join of G(I) to ΔG(M), G(I)><ΔG(M) is lossless with respect to G(I).
 3. The join of G(I) to ΔG(M), (e.g. G(I)><ΔG(M)) is one-to-one.
 4. GQ(I) are derivable from $G_M(I)$.

B. The Data Sufficiency Test requires that all columns of matching tables in the query other than the join columns be either equal to or functionally determined by columns in MV.

For example, assume that query Q is based on joins O><P><R><S and materialized view M is based on joins R><S><T. Then G(I)=R><S, ΔG(Q)=P><O and ΔG(M)=T. If G(I)><ΔG(M) is one-to-one lossless, i.e., in this case if (R><S)><T is one-to-one lossless, then query Q can be rewritten as O><P><M.

Database metadata may be examined to determine whether (R><S)><T is one-to-one lossless. Specifically, if S.c column is referentially constrained by the T.c column, then $(R><S)><_{s.c=t.c}T$ is lossless. Alternatively, the view definition of materialized view M may be examined to determine whether the join between S and T is an outer join, i.e., the materialized view definition specifies $(R><S)->_{s.c=t.c}T$. If so, then $(R><S)><_{s.c=t.c}T$ is lossless. Furthermore, if column T.c is unique, due to for example a unique constraint on T.c, then the join $(R><S)><_{s.c=t.c}T$ is one-to-one lossless. The query Q may thus be rewritten to reference the materialized view M.

In the above example, ΔG(M) contained only one table T. Determining one-to-one losslessness is more complicated when ΔG(M) contains more tables. For example, consider materialized view M that joins four tables $R><S><_{s.c=t.c}T><_{t.c=w.c}W$. Then G(I)=R><S, ΔG(Q)=P><O and $\Delta G(M)=T><_{t.c=w.c}W$. Rewrite with M is possible if join $(R><S)><_{s.c=t.c}(T><_{t.c=w.c}W)$ is one-to-one lossless. This occurs if the inner joins $S><_{s.c=t.c}T$ and $T><_{t.c=w.c}W$ are one-to-one lossless. The first join joins M to G(I) and the second is an internal join in ΔG(M). If S.c is referentially constrained by T.c and column T.c is referentially constrained by column W.c and columns T.c and W.c are unique, then $(R><S)><_{s.c=t.c}(T><_{t.c=w.c}W)$ is one-to-one lossless. Another sufficient condition is that the join between S and T is an outer join, i.e., if $M=(R><S)->_{s.c=t.c}(T><_{t.c=w.c}W)$, and columns T.c and W.c are unique.

A transformation may be needed if some joins in G(I) are not of the same type but are compatible. For example, if G(M)=S<-L->O and G(Q)=L><O><C, then ΔG(M)=S, G(I)=L->O, ΔG(Q)=C, and if S<-L is one-to-one lossless then Q can be rewritten as M><C with a filter added to exclude the anti-join rows of L->O. If M is a materialized view that contains rowid or primary keys of O, the filter "O.rowid is not null" or "O.pk is not null" is added to the rewritten Q.

One disadvantage of one-to-one lossless rewrite is that a materialized view may be excluded from consideration even though it has the data that may be used to satisfy a given query. This happens, for example, if the join G(I)><ΔG(M) between G(I) and ΔG(M) is lossless but not one-to-one, i.e., if conditions (1), (2) and (4) are met but condition (3) is not. Consider again Q=O><P><R><S and materialized view $M=R><S><_{s.c=t.c}T$. Assume that column S.c is referentially constrained by column T.c, but column T.c is not unique. Then join $S><_{s.c=t.c}T$ is lossless but not one-to-one. The rewrite of Q is then not possible under one-to-one lossless rewrite because not all conditions (1), (2), (3) and (4) are met.

To ensure that queries may be transformed by query rewrite mechanisms that perform one-to-one-lossless rewrites, developers of databases undertake measures that ensure that joins upon which materialized views are based are one-to-one with respect to joins in the materialized view delta subgraph. Such measures include imposing a uniqueness constraint upon a column of a table. Unfortunately, uniqueness constraints typically require maintenance of an index. Maintaining an index results in overhead in the form of additional storage space required to store the index and the additional processing required to build and update the index. Furthermore, for many database applications, a uniqueness constraint on many application fields is not feasible. Because using a materialized view frequently saves computer resources required to process queries, and avoiding the use of uniqueness constraints reduces overhead, it is desirable to provide a method of satisfying a query using data stored in a materialized that is based on a one-to-many join in the materialized view delta subgraph.

Functional Overview

According to an aspect of the present invention, a select-project-join query Q is rewritten into another query Q that joins a materialized view M and a subset of the tables from Q. Under the one-to-one lossless rewrite, Q can be rewritten with M if their graphs intersect on the intersection subgraph G(I) and if the join between G(I) and the materialized view delta subgraph $\Delta G(M)$, $G(I)><\Delta G(M)$, is one-to-one lossless. The present invention provides a more general class of rewrites for situations where the join $G(I)><\Delta G(M)$ is one-to-many lossless.

Since join $G(I)><\Delta G(M)$ is one-to-many lossless, the join may result in the duplication of G(I) tuples. The duplicated rows can be eliminated by using, for example, the DISTINCT operator of ANSI SQL language and placing a materialized view M in a new query block that contains a DISTINCT operator. The materialized view should, in this case, contain columns which allows us to uniquely distinguish individual rows of the intersection subgraph G(I). Those columns may be any unique column of each table in G(I), and typically are the psuedo rowid columns, primary or unique keys of the tables in G(I).

Exemplary Materialized View

The techniques described herein transform a first query into a second query that references a materialized view. To illustrate an embodiment of the present invention, structures depicted in FIGS. 3A and 3B, queries shown in FIG. 4, and the subgraph shown in FIG. 5 are provided.

Figure 3A:
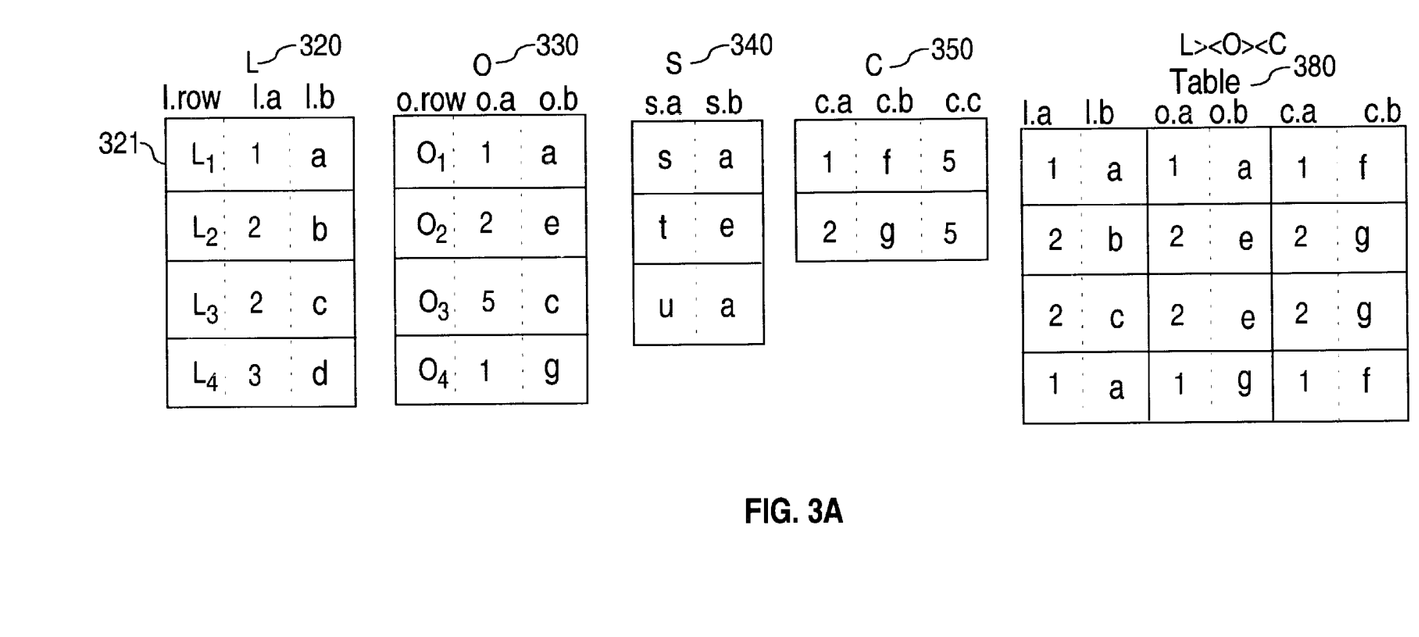
FIGS. 3A and 3B are block diagrams depicting tables and a materialized view used to illustrate query transformation according to an embodiment of the present invention.
Figure 4A:
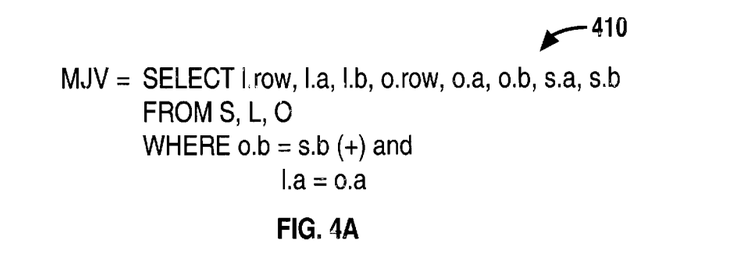
FIGS. 4A–4D are diagrams depicting a given query, a query upon which a materialized view is based, and transformation queries resulting from the transformation of the given query according to an embodiment of the present invention.

FIG. 3A is a block diagram showing tables L 320, O 330, and S 340, and C 350. Table L 320 has rowid pseudo-column l.row, and columns 1.$a$ and 1.$b$. The value $L_1$, in 1.row for row 321 uniquely identifies row 321 in table L 320.

Like table L 320, table O 220 has a rowid pseudo-column o.row, and columns 1.$a$ and 1.$b$. Tables S 340 has columns s.a and s.b and cable C350 has columns c.a, c.b, and c.c.

Figure 3B:
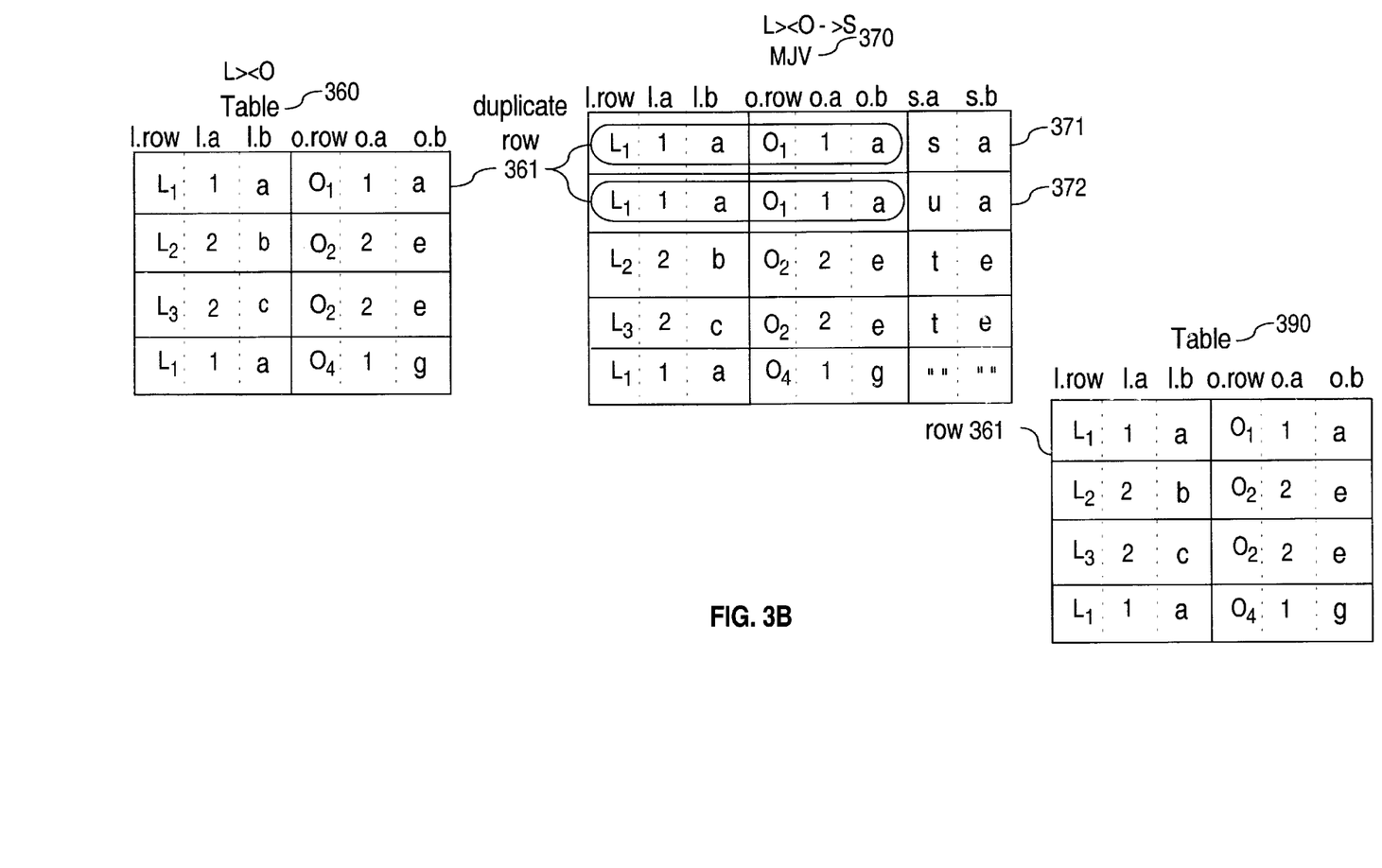

Referring to FIG. 3B, MJV 370 is a materialized view based on $L><_{l.b=o.b}O->_{o.b=s.b}S$. The materialized view is based on the query 410 shown in FIG. 4A.

Table 360 represents $L><_{l.a=o.a}O$. The (L><O)->(S) is one-to-many with respect to L><O. Row 361 in table 360 (i.e. L><O) is duplicated in MJV 370 in row 371 and row 372.

Figure 4B:
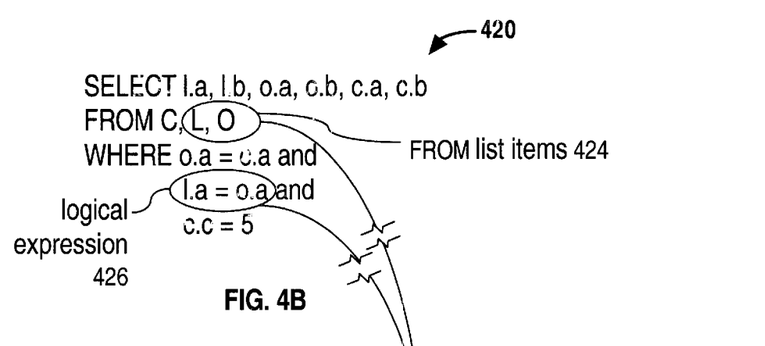
Figure 5:
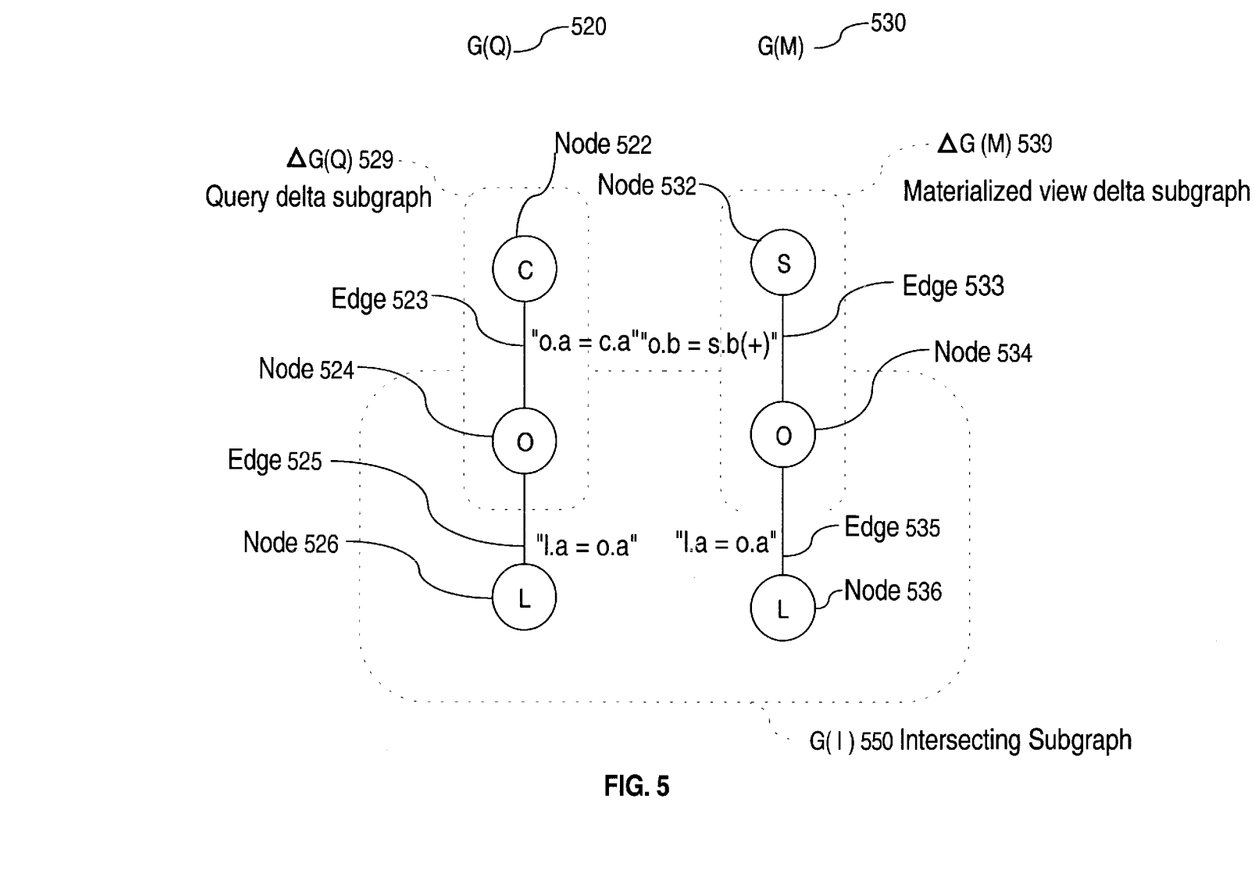
FIG. 5 is an exemplary query graph representing the queries used to illustrate an embodiment of the present invention.

FIG. 4B shows exemplary query 420 which is provided as an example demonstrating a query transformation according to techniques for transforming a query described herein. Query 420 specifies join $L><_{l.a=o.a}O><_{o.b=c.a}C$. Table 380 represents the results of join L><O>241 C.

FIG. 5 shows L><O><C decomposed into query graph G(Q) 320 and L><O->S decomposed into query graph G(M). Node 522 corresponds to table C 550, node 524 to table O 330, and node 526 to table L 520. Edge 523 corresponds to O><C, and edge 525 to L><O. Node 532 corresponds to table S 340, node 534 to table O 330, and node 536 to table L 320. Edge 533 corresponds to O><C, and edge 535 to L ><O.

Transforming a One-To-Many Lossless Query

Figure 6:
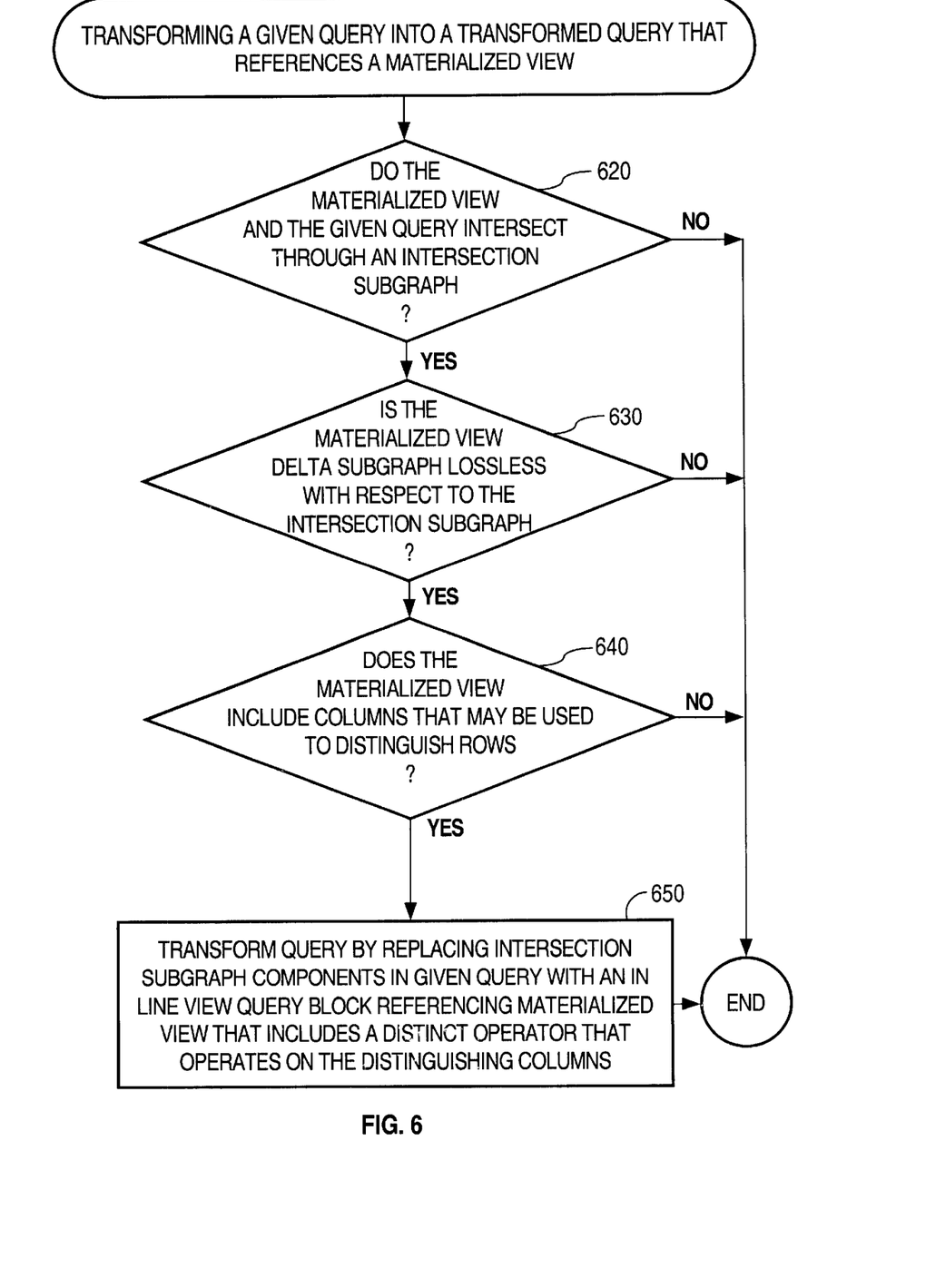
FIG. 6 is a flow chart depicting steps for query transformation according to an embodiment of the present invention.
Figure 7:
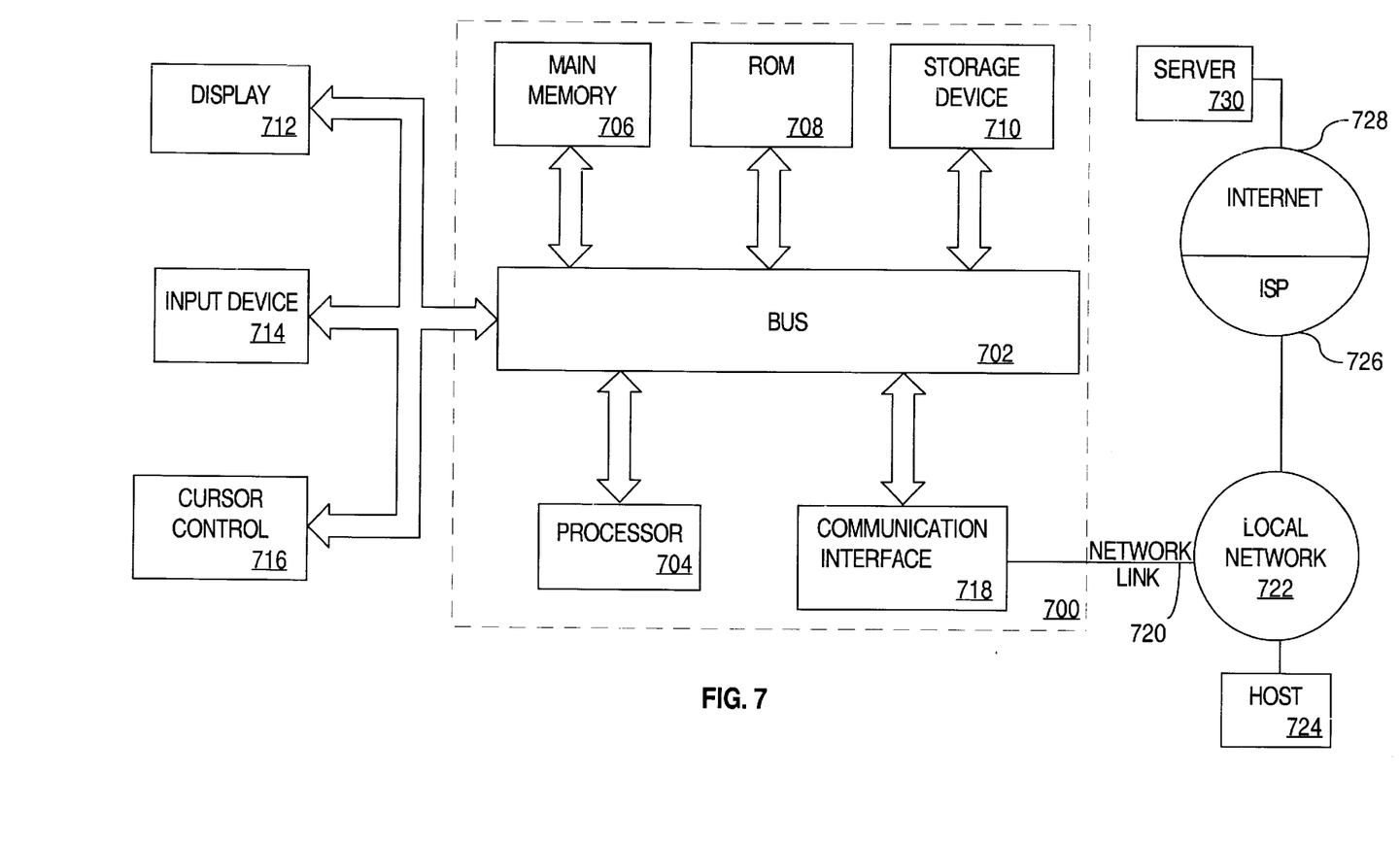
FIG. 7 is a block diagram depicting a computer system upon which an embodiment of the present invention may be implemented.

FIG. 6 shows the steps for transforming a given query into a transformed query that uses a materialized view. According to an embodiment of the present invention, the steps may be performed by a database manager in response to the database manager receiving the given query. In response to receiving the query, typically a database manager performs various optimization procedures to determine whether the query may be transformed into a more efficient query. According to an embodiment of the present invention, the optimization procedures include execution of the steps shown in FIG. 6. The steps may be executed after the database manager has decomposed the given query into graph G(Q) 520 (FIG. 5), selects a materialized view, which is decomposed into a graph G(M) 530. The graphs G(Q) 520 and G(M) 530 are compared to determine whether the materialized view may be used to transform the given query.

Referring to FIG. 6, at step 620, it is determined whether the given query and materialized view intersect. This determination is made by comparing query graphs for the materialized view and the given join. In this example, G(M) 520 intersects G(Q) 530 forming G(I) 550, i.e. subgraph for L><O.

At step 630, it is determined whether the join between the materialized view delta subgraph (i.e. $\Delta G(M)$) and intersection subgraph (i.e. G(I)) is lossless. If the join is not lossless, execution of the steps ceases. Otherwise, control passes to step 640.

In this example, query 410 specifies an outer join between table O 330 and table S 340. Table O 330 is a table included in the G(I) 550 and table S 340 is in $\Delta G(M)$ 539 (FIG. 5). Thus, the determination is that the join is lossless because the join between tables O 330 and S 340 is an outerjoin. Control thus passes to step 640.

At step 640, it is determined whether the materialized view query specifies one or more columns that, for each respective table in the common join, may be used to uniquely distinguish each row within the row's respective table. If there are no distinguishing columns for all the respective tables, then execution of the steps ceases. Otherwise control flows to step 650.

There are a variety of techniques that may be used to make this determination. For example, the SELECT list of the materialized view query may be examined to determine whether the select list contains, for each table included in intersecting subgraph G(I), a column that uniquely identifies the rows in the table. Examples of columns which uniquely identify rows in this manner are a rowid pseudo-column, a uniquely constrained column, and a unique key column. In this example, it is determined that a rowid column for each table in L><O is contained in the SELECT list. Therefore, control flows to step 650.

At step 650, the given query is transformed by substituting components of the given query attributable to the intersection subgraph with an inline view query block referencing the materialized view. Specifically, the tables in the intersection subgraph are replaced in the FROM list with an inline view query block that references the materialized view. To remove any duplicates in the materialized view that arise out of the one-to-many relationship with respect to the intersecting subgraph, (1) the distinguishing columns determined at step 640 are included in the SELECT list of the inline view query block, and (2) a DISTINCT operator that operates upon the columns of the SELECT list is included in the query block.

Figure 4C:
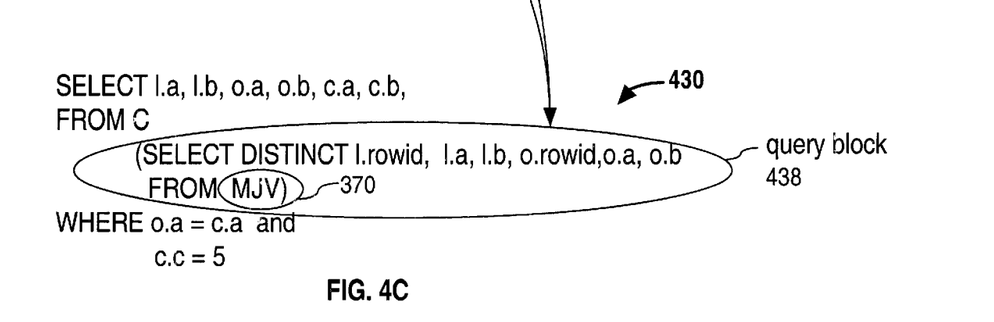
Figure 4D:
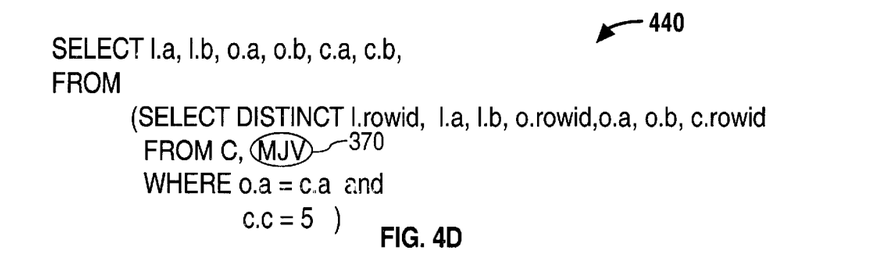

In this example, FIG. 4C shows query 420 after being transformed into transformed query 430. Specifically, query block 438 replaces FROM list items 424 (i.e. "L, O") with materialized view query block 438, and the logical expression 426, which represents the join condition of the G(I) 550 (i.e. 1.$a$=o.a), may be removed.

After the given query 420 is transformed into transformed query 430, it may be executed. First, the results of the subquery 438 are generated. Table 390 represents the resulting rows. Due to the application of the DISTINCT operator, row 361, which was duplicated in MJV 370, is reflected only once in table 390.

Next, the join between table 390 and table C 350 is executed. This join results in table 380, which represents the set of data that would have been returned by the query 380.

In other embodiments of the present invention, additional transformations or optimizations may be performed before or after the steps shown in FIG. 6 are applied to a particular query. For example, for example, assume that the join corresponding to G(I) 550, i.e. L><O, is one-to-one lossless. In this case, only one distinguishing column is needed (e.g. 1.row) in the SELECT list of the inline view query data block.

HARDWARE OVERVIEW

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for transforming queries. According to one embodiment of the invention, the transforming queries is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for transforming queries as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of transforming a first query, the method comprising the steps of:
   receiving the first query;
   determining whether a common section is shared between a view and said first query, wherein:
      said view is a join view that combines data from a plurality of base tables,
      a view definition for said view includes a join between said common section and a materialized view delta of said view,
      said plurality of base tables are not constrained such that said join between said common section and said materialized view delta is one-to-one with respect to said common section;
   determining whether said join between said common section and said materialized view delta is lossless with respect to said common section; and
   if said join between said common section and said materialized view delta is lossless with respect to said common section, then transforming said first query into a second query that accesses data through said view, said second query returning the set of data specified by said first query.

2. The method of claim 1, wherein said view is a materialized view and the step of transforming said first query includes transforming said first query into a second query that accesses data from said materialized view.

3. The method of claim 1, wherein the step of transforming said first query includes rewriting said first query to include a query block referencing said view that returns only one row for any row resulting from said common join.

4. The method of claim 1, wherein rows presented by said view each correspond to one row resulting from said common section, and the step of transforming said first query into a second query further includes the steps of:
   determining whether said view definition defines one or more distinguishing columns that for each of said rows presented by said view, uniquely identify the one row resulting from said common section that corresponds to said row presented by said view; and
   rewriting said first query to include a query block that references said view, said query block including a DISTINCT operator that operates upon a list of columns that include said one or more distinguishing columns.

5. The method of claim 4, wherein the step of determining whether said view defines one or more distinguishing columns further includes determining whether said view defines a row-id column, wherein:
   said row-id column corresponds to row-ids that are each associated with a row from a first table; and
   each row-id associated with a row from said first table uniquely identifies the row from said first table relative to all rows of said first table.

6. The method of claim 4, wherein:
   said common section includes a join of a first table and a second table, wherein:
      a first set of row-ids is associated with rows of said first table, wherein said first set of row-ids uniquely identify each row of said first table relative to all rows of said first table, and
      a second set of row-ids is associated with rows of said second table, wherein said second set of row-ids uniquely identify each row of said second table relative to all rows of said second table;
   said view includes a first row-id column corresponding to said first set of row-ids, and a second row-id column corresponding to said second set of row-ids; and
   wherein the step of rewriting said first query includes rewriting said first query to include a query block comprised of a DISTINCT operator that operates upon a plurality of columns that includes said first row-id column and said second row-id column.

7. The method of claim 4, wherein the step of determining whether said view defines one or more distinguishing columns includes determining whether said view defines a column that corresponds to a unique key column of a first table.

8. The method of claim 1, wherein the step of determining whether said join between said common section and said materialized view delta is lossless includes determining whether said view definition specifies an outer join between a first table in said common section and a second table in said materialized view delta.

9. The method of claim 1, wherein the step of determining whether said join between said common section and said materialized view delta is lossless includes determining whether said view definition defines a join between a first table included in said common section and a second table to which said first table is referentially constrained.

10. A computer-readable medium carrying one or more sequences of one or more instructions for transforming a first query, wherein the execution of the one or more sequences of the one or more instructions causes the one or more processors to perform the steps of:
    receiving the first query;
    determining whether a common section is shared between a view and said first query, wherein:

said view is a join view that combines data from a plurality of base tables,
a view definition for said view includes a join between said common section and a materialized view delta,
said plurality of base tables are not constrained such that said join between said common section and said materialized view delta is one-to-one with respect to said common section;
determining whether said join between said common section and said materialized view delta is lossless with respect to said common section; and
if said join between said common section and said materialized view delta is lossless with respect to said common section, then transforming said first query into a second query that accesses data through said view, said second query returning the set of data specified by said first query.

11. The computer-readable medium of claim 10, wherein said view is a materialized view and the step of transforming said first query includes transforming said first query into a second query that accesses data from said materialized view.

12. The computer-readable medium of claim 10, wherein the step of transforming said first query includes rewriting said first query to include a query block referencing said view that returns only one row for any row resulting from said common join.

13. The computer-readable medium of claim 10, wherein rows presented by said view each correspond to one row resulting from said common section, and the step of transforming said first query into a second query further includes the steps of:
determining whether said view definition defines one or more distinguishing columns that for each of said rows presented by said view, uniquely identify the one row resulting from said common section that corresponds to said row presented by said view; and
rewriting said first query to include a query block that references said view, said query block including a DISTINCT operator that operates upon a list of columns that include said one or more distinguishing columns.

14. The computer-readable medium of claim 13, wherein the step of determining whether said view defines one or more distinguishing columns further includes determining whether said view defines a row-id column, wherein:
said row-id column corresponds to row-ids that are each associated with a row from a first table; and
each row-id associated with a row from said first table uniquely identifies the row from said first table relative to all rows of said first table.

15. The computer-readable medium of claim 13, wherein:
said common section includes a join of a first table and a second table, wherein:
a first set of row-ids is associated with rows of said first table, wherein said first set of row-ids uniquely identify each row of said first table relative to all rows of said first table, and
a second set of row-ids is associated with rows of said second table, wherein said second set of row-ids uniquely identify each row of said second table relative to all rows of said second table;
said view includes a first row-id column corresponding to said first set of row-ids, and a second row-id column corresponding to said second set of row-ids; and
wherein the step of rewriting said first query includes rewriting said first query to include a query block comprised of a DISTINCT operator that operates upon a plurality of columns that includes said first row-id column and said second row-id column.

16. The computer-readable medium of claim 13, wherein the step of determining whether said view defines one or more distinguishing columns includes determining whether said view defines a column that corresponds to a unique key column of a first table.

17. The computer-readable medium of claim 10, wherein the step of determining whether said join between said common section and said materialized view delta is lossless includes determining whether said view definition specifies an outer join between a first table in said common section and a second table in said materialized view delta.

18. The computer-readable medium of claim 10, wherein the step of determining whether said join between said common section and said materialized view delta is lossless includes determining whether said view definition defines a join between a first table included in said common section and a second table to which said first table is referentially constrained.

19. A database system comprising:
a processor;
a memory coupled to said processor;
said processor configured to receive a first query;
a view definition defining a view, said view definition specifying a set of joins between a set of base tables;
said processor configured to determine whether a common section is shared between said view and said first query, wherein said plurality of base tables are not constrained such that a join between said common section and a materialized view delta for said view is one-to-one with respect to said common section;
said processor configured to determine whether said join between said common section and said materialized view delta is lossless with respect to said common section; and
said processor configured to, if said join between said common section and said materialized view delta is lossless with respect to said common section, transform said first query into a second query that references said view, said second query returning the set of data specified by said first query.

20. The database system of claim 19, wherein said view is a materialized view.

* * * * *